United States Patent
Gweon (10) Patent No.: US 8,966,948 B2
(45) Date of Patent: Mar. 3, 2015

(54) ELECTRICAL STEERING COLUMN LOCK

(71) Applicant: Hyundai Motor Company, Seoul (KR)

(72) Inventor: Sang Hoon Gweon, Seoul (KR)

(73) Assignee: Hyundai Motor Company, Seoul (KR)

(*) Notice: Subject to any disclaimer, the term of this patent is extended or adjusted under 35 U.S.C. 154(b) by 120 days.

(21) Appl. No.: 13/772,177

(22) Filed: Feb. 20, 2013

(65) Prior Publication Data

US 2014/0150503 A1    Jun. 5, 2014

(30) Foreign Application Priority Data

Dec. 3, 2012 (KR) .......... 10-2012-0139098

(51) Int. Cl.
*B60R 25/02* (2013.01)
*B60R 25/021* (2013.01)
*B60R 25/0215* (2013.01)

(52) U.S. Cl.
CPC ..... *B60R 25/02115* (2013.01); *B60R 25/02153* (2013.01)
USPC .............................. 70/186; 70/252

(58) Field of Classification Search
USPC .......................... 70/182–186, 252
See application file for complete search history.

(56) References Cited

U.S. PATENT DOCUMENTS

| | | | | |
|---|---|---|---|---|
| 7,021,093 | B2* | 4/2006 | Fukatsu et al. ........ | 70/186 |
| 8,646,296 | B2* | 2/2014 | Okada et al. ........... | 70/186 |
| 2004/0148983 | A1* | 8/2004 | Suzuki et al. .......... | 70/186 |
| 2004/0182121 | A1* | 9/2004 | Fukatsu et al. ........ | 70/186 |
| 2005/0223761 | A1* | 10/2005 | Okuno et al. .......... | 70/186 |
| 2006/0021398 | A1* | 2/2006 | Hasegawa et al. .... | 70/186 |
| 2007/0113604 | A1* | 5/2007 | Khoury et al. ........ | 70/186 |
| 2008/0047309 | A1* | 2/2008 | Okuno et al. .......... | 70/252 |
| 2008/0087056 | A1* | 4/2008 | Tsukazaki ............. | 70/182 |
| 2008/0271504 | A1* | 11/2008 | Okada et al. .......... | 70/252 |
| 2009/0139284 | A1* | 6/2009 | Sugimoto .............. | 70/186 |
| 2009/0266122 | A1* | 10/2009 | Okada et al. .......... | 70/252 |
| 2010/0064742 | A1* | 3/2010 | Okada et al. .......... | 70/185 |
| 2010/0083716 | A1* | 4/2010 | Fukatsu et al. ........ | 70/186 |
| 2010/0212377 | A1* | 8/2010 | Graglia ................. | 70/183 |
| 2011/0132048 | A1 | 6/2011 | Okada | |
| 2011/0167885 | A1* | 7/2011 | Sugimoto .............. | 70/186 |
| 2012/0260701 | A1* | 10/2012 | Okada et al. .......... | 70/183 |

FOREIGN PATENT DOCUMENTS

| | | |
|---|---|---|
| JP | 2011-148356 A | 8/2011 |
| KR | 20070047469 A | 5/2007 |
| KR | 100820458 B1 | 4/2008 |
| KR | 20110038136 A | 4/2011 |

* cited by examiner

*Primary Examiner* — Lloyd Gall
(74) *Attorney, Agent, or Firm* — McDermott Will & Emery LLP (57) ABSTRACT

An electrical steering column lock includes a locking guide that advances and retreats with respect to a lock ring by a driving part, and a lock bar that advances and retreats toward and from the locking guide within a predetermined distance in the same direction as that of the locking guide. The lock bar has a leading end disposed toward the lock ring, and is elastically biased toward the locking guide in a lock ring direction. One side of the locking guide is provided with a protrusion. A slider that advances toward the locking guide or retreats from the locking guide is positioned facing the protrusion, and the slider is provided with a grooved part into which the protrusion is inserted.

5 Claims, 7 Drawing Sheets

ELECTRICAL STEERING COLUMN LOCK

CROSS-REFERENCE TO RELATED APPLICATION

This application claims priority to Korean Patent Application No. 10-2012-0139098, filed on Dec. 3, 2012 in the Korean Intellectual Property Office, the disclosure of which is incorporated herein in its entirety by reference.

FIELD OF THE INVENTION

The present disclosure relates to an electrical steering column lock (referred to as an 'ESCL'), and more particularly, to an electrical steering column lock capable of providing a fastening force to prevent a lock bar from jumping and becoming separated from a lock ring disposed at the outer diameter of a column shaft even when a strong torque is applied to steering wheel and shaft.

BACKGROUND OF THE INVENTION

Generally, when a driver turns off, the ignition of a vehicle and pulls out a key, an electrical steering column lock has been used to lock a steering wheel 1 (FIG. 1) to thereby prevent the steering wheel 1 from moving. The electrical steering column lock should be configured to prevent the steering wheel and the column shaft from being unlocked even when a torque at or above a predetermined amount is applied to steering wheel 1 and column shaft 2.

Figure 1:
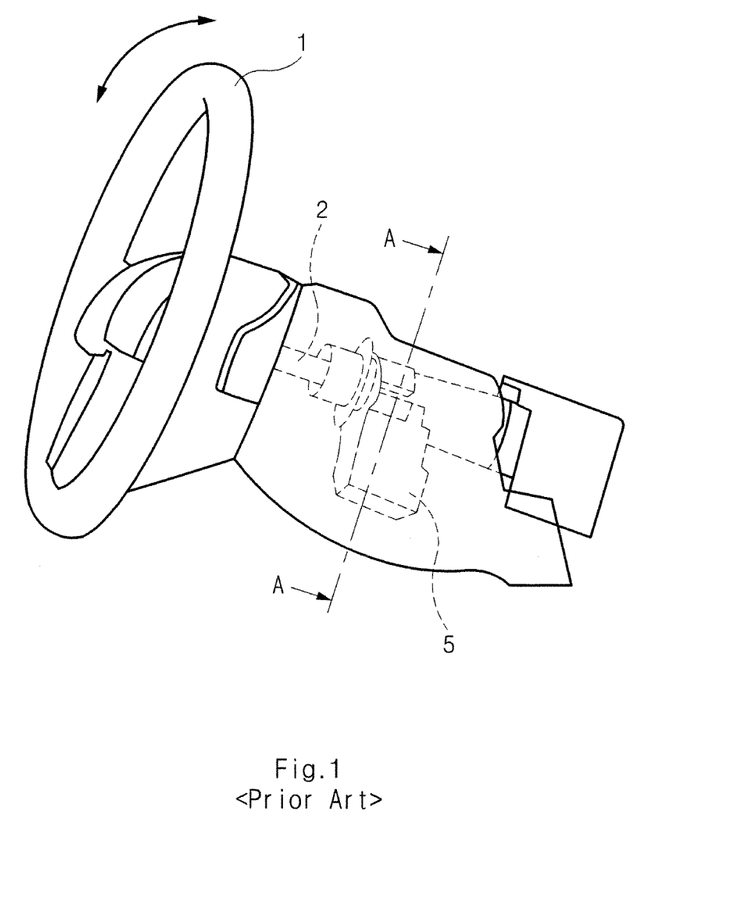
FIG. 1 is a perspective view illustrating an apparatus associated with a steering wheel.
Figure 2:
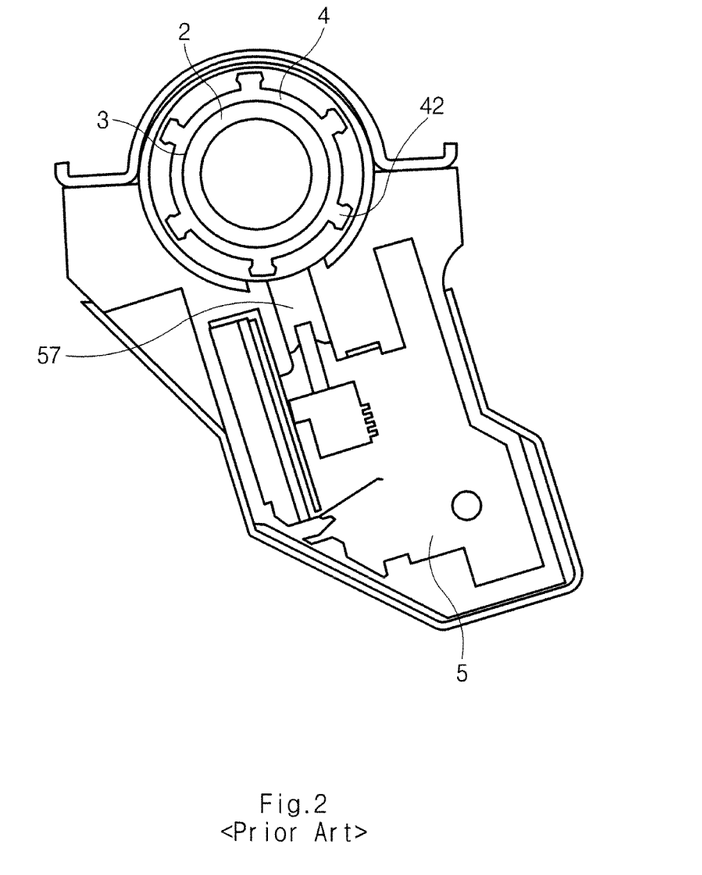
FIG. 2 is a cross-sectional view taken along the line A-A of FIG. 1 illustrating a column shaft connected with a steering wheel and an electrical steering column lock disposed to lock the steering wheel.
Figure 3:
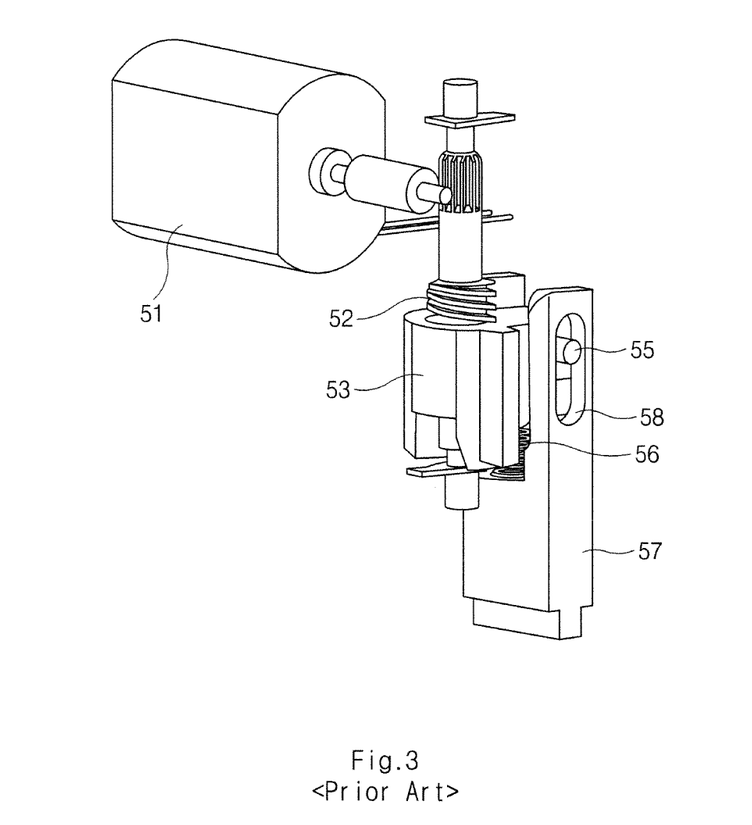
FIG. 3 is a perspective view illustrating an electrical steering column lock according to the prior art.
Figure 4:
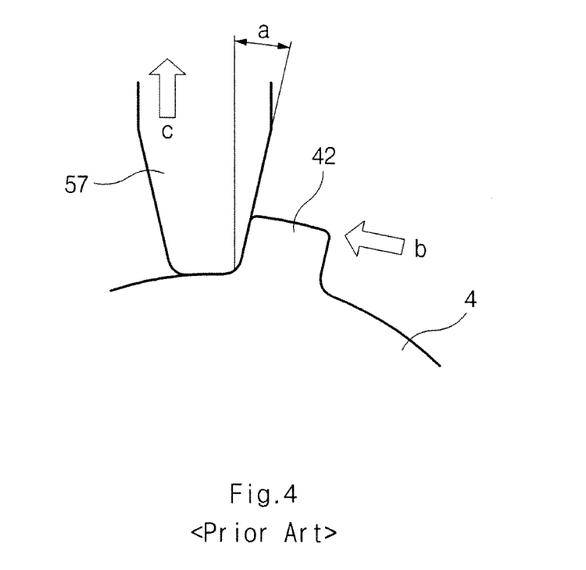
FIG. 4 is a diagram illustrating a locked state of the steering column by a lock bar of the electrical steering column lock inserted into a lock ring of the column shaft so as to be locked into a locking projection.

FIG. 1 is a perspective view illustrating an apparatus associated with a steering wheel. FIG. 2 is a cross-sectional view taken along the line A-A of FIG. 1 illustrating a column shaft connected with a steering wheel and an electrical steering column lock disposed to lock the steering wheel. FIG. 3 is a perspective view illustrating an electrical steering column lock according to prior art, and FIG. 4 is a diagram illustrating a locked state of the steering column by inserting a lock bar of the electrical steering column lock into a lock ring of the column shaft so as to be locked into a locking projection. As illustrated in FIGS. 1 to 4, steering wheel 1 is connected with the column shaft 2, and column shaft 2 is connected with a steering apparatus of a vehicle to adjust the steering angle according to steering wheel 1 rotation.

Meanwhile, the outside of the column shaft 2 is provided with a lock ring 4, having a slip ring 3 interposed therebetween. An outer surface of the lock ring 4 is provided with a locking projection 42. The lock ring 4 receives a lock bar 57 of an electrical steering column lock 5 so as to interfere with the locking projection 42, such that rotation of the steering wheel 1 and the column shaft 2 is restricted. That is, when the lock bar 57 advances as soon as a driver turns off the ignition of a vehicle, and pulls out a key, the steering wheel is locked in an "OFF" state so as not to move.

The lock bar 57 advances and retreats according to the advancing and retreating of a locking guide 53 that is screw-connected with a worm gear 52, connected with a motor 51, rotating according to rotation of the motor 51 and receiving the worm gear 52. A pin 55 formed on the locking guide 53 is inserted into an elongated hole 58 of the lock bar 57, and an internal spring 56 is inserted between the locking guide 53 and the lock bar 57, such that the lock bar 57 is elastically supported by the locking guide 53, biased toward the lock ring 4.

The reason why an end of the locking guide 53 is not directly inserted into the lock ring 4 and the lock bar 57 is elastically connected with the locking guide 53 is as follows.

When the locking projection 42 coincides with the advance position of the lock bar 57 according to the position of the stopping steering wheel 1 and column shaft 2, the lock bar 57 interferes with an upper surface of the locking projection 42 so as to no longer advance, and the internal spring 56 is compressed. When a driver turns the steering wheel 1 to slightly change the position of the locking projection 42 so as to release the interference with the lock bar 57, the lock bar further advances so as to enter a side of the locking projection 42. That is, with the steering wheel 1 in the state in which the ignition of a vehicle is turned off, when the position of the locking projection 42 is not constant, the lock bar 57 does not advance, because it is directly connected with the motor 51, but elastically advances once by way of the internal spring 56.

However, due to the above described structure, the lock bar 57 locks the lock ring 4 with the elastic force by the internal spring 56. In addition, as illustrated in FIG. 4, when the lock bar 57 retreats from the lock ring 4, it is inevitable to develop a chamfer a so as to facilitate undesirable retreat of the lock bar 57. Therefore, when a torque b applied to the steering wheel 1 is larger than a predetermined value, a component of force c is generated in a direction in which the lock bar 57 retreats by virtue of the chamfer a. When the force c is increased and thus overcomes the elastic force of the internal spring 56, the lock bar 57 retreats from the lock ring 4 to cause a jumping phenomenon.

This phenomenon is problematic during a regulatory testing of steering column locking strength. According to regulations on the steering column locking strength, when the slip ring 3 is interposed between the column shaft 2 and the lock ring 4, the column shaft 2 needs to withstand a column rotation torque of 100 Nm or more when the column shaft 2 rotates to the left and right five times by 90°. However, the chamfer a of the lock bar 57 and the locking projection 42 of the lock ring 4 may become deformed during forced rotation of the column shaft 2 to generate a larger component of force c than expected, such that the lock bar 57 jumps from the lock ring 4 before the predetermined torque is applied.

This phenomenon changes according to variations in machining and surface treatment of the lock ring 4 and the lock bar 57 of the steering column. Therefore, the electrical steering column lock cannot be aptly robust and controlled.

SUMMARY OF THE DISCLOSURE

Accordingly, the present disclosure is directed to solving the above-mentioned problems occurring in the prior art while maintaining intact advantages achieved by the prior art.

One aspect of the present disclosure encompasses an electrical steering column lock to allow a lock bar to reliably support a lock ring and prevent the lock bar from jumping from the lock ring regardless of manufacturing variations such as in machining and surface treatment of the lock ring and the lock bar while maintaining an elastic support structure to smoothly advance the lock bar regardless of position of a locking projection of the locking ring.

Another aspect of the present disclosure provides an electrical steering column lock, including: a locking guide that advances and retreats with respect to a lock ring by a driving of a driving part; and a lock bar that advances toward and retreats from the locking guide within a predetermined distance in the same direction as the advance and retreat direction of the locking guide. The lock bar has a leading end disposed toward the lock ring, and is elastically supported by the locking guide in a lock ring direction, wherein one side of the locking guide is provided with a protrusion. A slider that advances toward the locking guide or retreats from the locking guide is positioned facing the protrusion of the locking guide, and the slider is provided with a grooved part into which the protrusion is insertable.

The slider may be elastically biased toward the locking guide. At least any one surface of the slider at which the protrusion contacts the groove may be provided with an inclined surface to advance toward the locking guide, such that the slider advances toward the locking guide while the grooved part receives the protrusion along the inclined surface and to retreat from the locking guide, such that the slider retreats from the locking guide while the grooved part receiving the protrusion is separated from the protrusion along the inclined surface.

The lock bar may be provided with a key groove, the slider may include a key member that is inserted into the key groove, and the key member may be inserted into the key groove while the slider advances toward and is separated from the key groove while the slider retreats.

The key groove may have the key member inserted into and separated from the key groove in a state in which the lock bar advances so as to be locked into the lock ring The locking guide may be provided with a pin and the lock bar may be provided with an elongated hole that is longitudinally provided in the direction of the advance and retreat direction thereof, and may be elastically supported to the locking guide biased in a lock ring direction in the state in which the elongated hole receives the pin.

BRIEF DESCRIPTION OF THE DRAWINGS

The above and other objects, features and advantages of the present invention will be more apparent from the following detailed description taken in conjunction with the accompanying drawings, in which:

FIGS. 6(a) to 6(c) are diagrams illustrating processes of locking a steering column that is unlocked by the electrical steering column lock according to the exemplary embodiment of the present disclosure; and FIGS. 7(a) to 7(c) are diagrams illustrating processes of unlocking the steering column that is locked by the electrical steering column lock according to the exemplary embodiment of the present disclosure.

DETAILED DESCRIPTION OF THE PREFERRED EMBODIMENTS

Exemplary embodiments of the present disclosure are based on reliably maintaining a locked state when a lock bar is locked, without completely changing a driving principle and operating principle of locking and unlocking an electrical steering column lock according to the prior art. Hereinafter, exemplary embodiments of the present disclosure will be described in detail with reference to the accompanying drawings.

Figure 5:
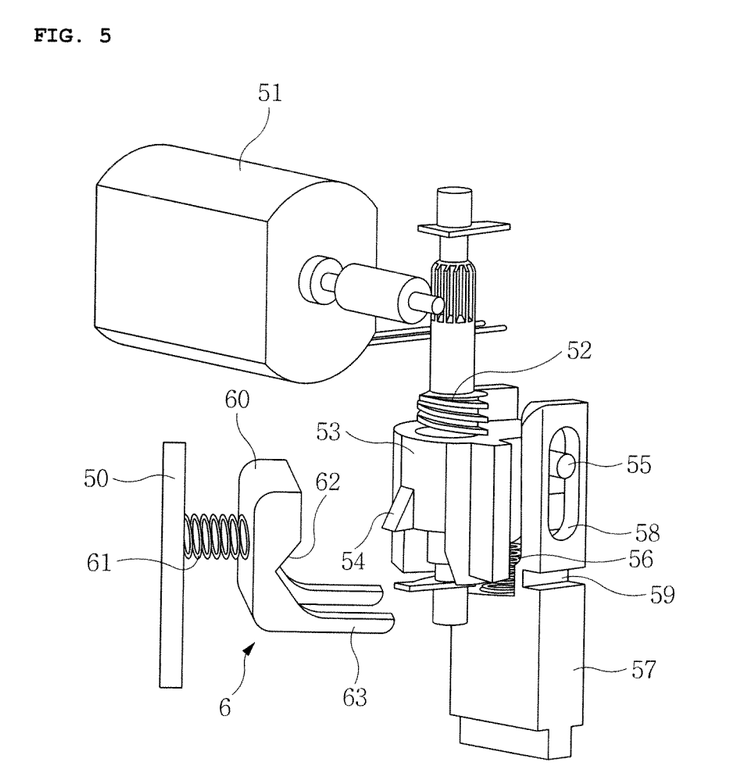
FIG. 5 is a perspective view illustrating an electrical steering column lock according to an exemplary embodiment of the present disclosure.
Figure 6:
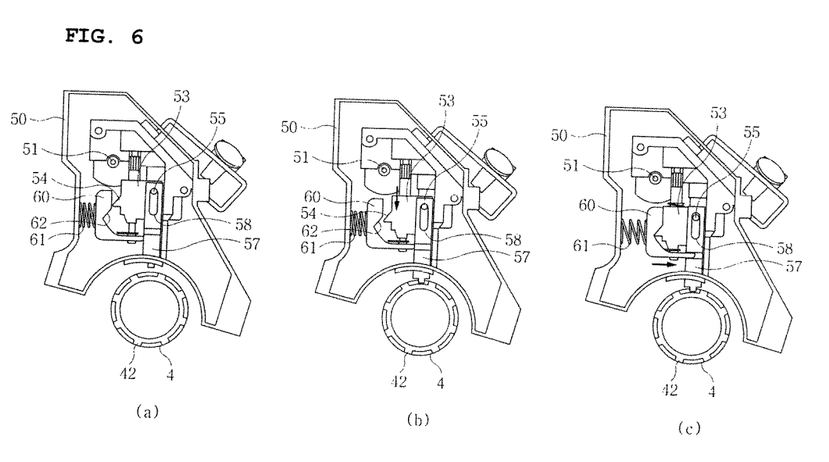
Figure 7:
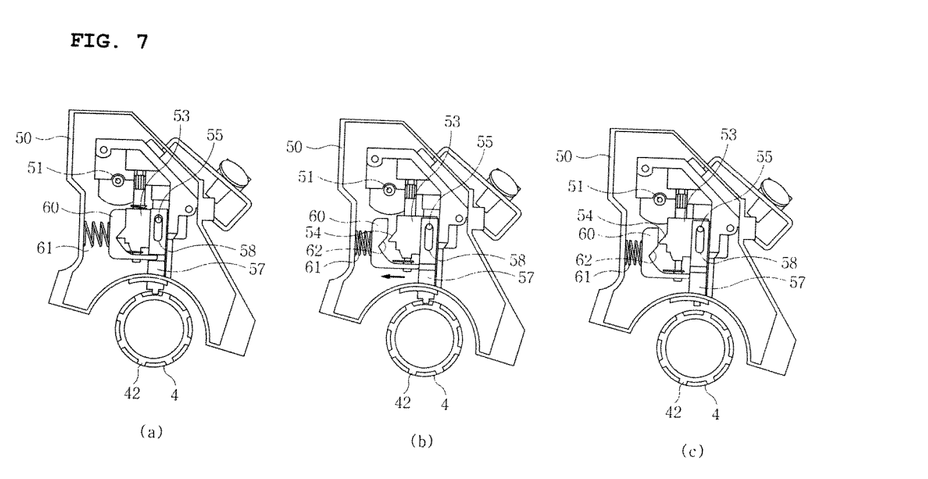

FIG. 5 is a perspective view illustrating an electrical steering column lock according to an exemplary embodiment of the present disclosure, FIGS. 6A to 6C are diagrams illustrating processes of locking a steering column that is unlocked by the electrical steering column lock according to the exemplary embodiment of the present disclosure, and FIGS. 7A to 7C are diagrams illustrating processes of unlocking the steering column that is locked by the electrical steering column lock according to the exemplary embodiment of the present disclosure.

In describing the exemplary embodiments of the present disclosure, description of overlapping components with the prior art as described above will be omitted.

Referring to FIG. 5, an electrical steering column lock according to the exemplary embodiment of the present disclosure includes a motor 51 that is a driving source within a housing 50, and a worm gear 52 formed at an end of a rotating shaft (no reference numeral) that is meshed with the worm gear (not illustrated) formed at a shaft of the motor and rotates together with the rotation of the shaft of the motor. The shaft direction of the worm gear 52 is in parallel with the advance and retreat direction of the locking guide 53 as described below.

Further, the locking guide 53, which is screw-connected with the worm gear 52 and receives the worm gear 52, is disposed within the housing 50. A guide part (no reference numeral) protrudes from one surface or both surfaces of the locking guide 53 in the same longitudinal direction as the advance and retreat direction of the locking guide 53 and a slit (not illustrated) receiving the guide part is disposed in the housing 50, such that the locking guide 53 is guided longitudinally. Therefore, even when the worm gear 52 rotates according to the rotation of the motor 51, the locking guide 53 that is screw-connected with the worm gear 52 does not rotate together with the worm gear 52 but advances or retreats along the guide part by the screw connection. Meanwhile, a pin 55 is fastened with the locking guide 53.

A rear end of the lock bar 57 is longitudinally provided with an elongated hole 58, and a leading end thereof is provided with a chamfer as described above. The rear end of the lock bar 57 is extended backwardly so as to enclose both surfaces of the locking guide 53 and the elongated hole 58 is longitudinally disposed on the extensions. The pin 55 is inserted into the elongated hole 58. Therefore, the position of the lock bar 57 is relatively constrained by the pin 55 with respect to the locking guide 53, so that the lock bar 57 can advance and retreat toward and from the locking guide 53 by as much as the length of the elongated hole 58.

An internal spring 56 is inserted into a space between the foregoing extensions of the lock bar 57. The longitudinal direction of the internal spring 56, which is a coil spring, coincides with the advance and retreat direction of the lock bar 57, and both ends of the internal spring 56 are supported by the locking guide 53 and the lock bar 57, respectively. Therefore, the leading end of the lock bar 57 is elastically supported in a direction that extends far away from the locking guide 53. When the lock bar 57 is not applied with any external force by the structure (see FIGS. 6(a) and 7(c)), the lock bar 57 is disposed at the farthest position from the locking guide 53. In this case, the rear end of the elongated hole 58 faces the pin 55. Further, when external force is applied from the leading end of the lock bar 57 toward the rear end thereof (see FIG. 7(a)), the internal spring 56 is contracted by the external force and the lock bar 57 retreats toward the locking guide.

Meanwhile, one side of the locking guide 53 is provided with a protrusion 54 of which the surface facing the retreat direction forms an inclined surface, and both surfaces of the lock bar 57 are each provided with key grooves 59 that are depressed in a direction orthogonal to the advance and retreat direction.

A position facing the protrusion 54 of the locking guide 53 within the housing 50 is provided with a slider 6. The slider 6 is guided by the housing 50 so as to advance toward the locking guide 53 and the lock bar 57 or retreat therefrom in a direction orthogonal to the advancing direction of the locking guide 53 and the lock bar 57. The rear of the body 60 of the slider 6 is provided with a spring 61. One end of the spring 61 is supported by the housing 50, and the other end of the spring 61 is supported by the rear surface of the body 60. Therefore, the slider 6 is elastically supported by the spring 61 biased in a direction facing the locking guide 53 and the lock bar 57.

A grooved part 62 is formed at a position corresponding to the protrusion 54 in the body 60 of the slider 6, and an inclined part that correspondingly contacts the inclined surface of the protrusion 54 is formed on the grooved part 62. Further, the body 60 is provided with a key member 63 that corresponds to the key groove 59 and is inserted into or separated from the key groove 59.

Operation of the electrical steering column lock having the foregoing structure will now be described with reference to FIGS. 6(a)-(c) and 7(a)-(c).

First, FIGS. 6(a)-6(c) illustrate a process of operating the electrical steering column lock from the unlocked state to the locked state. Referring to FIG. 6(a), the illustrated state is one in which the locking guide 53 most retreats from the lock ring 4. Since no external force is applied to the lock bar 57 in this state, the lock bar 57 extends far away from the locking guide 53 by the internal spring 56. Further, the slider 6 (FIG. 5) is elastically supported toward the locking guide 53 by the spring 61, but the body 60 of the slider 6 faces the leading end of the protrusion 54 so as not to advance toward the locking guide 53.

As the motor 51 starts to rotate in this state, the locking guide 53 starts to advance toward the lock ring 4 by rotation of the worm gear 52. The lock bar 57 advances with the advance of the locking guide 53, and the state in which the chamfer formed at the leading end of the lock bar 57 enters a space between the locking protrusions 42 corresponds to the state of FIG. 6(b). In this state, the protrusion 54 is not yet inserted into the grooved part 62, such that the slider 6 does not yet advance, the lock bar 57 is in the most advancing state but the locking guide 53 has space to further advance. The internal spring 56 between the lock bar 57 and the locking guide 53 is in a state in which the compression is no longer performed at the same level as in FIG. 6(a).

Next, as the motor 51 further rotates, the lock bar 57 reaches the state of FIG. 6(c) in which the locking guide 53 further advances toward the lock ring 4, to the state in which the lock bar 57 cannot advance any longer. Since the internal spring 56 is compressed while the locking guide 53 further advances, a stronger elastic force is applied to the lock bar 57. In addition, the slider 6 advances toward the locking guide 53 while the protrusion 54 of the locking guide 53 is inserted into the grooved part 62. As such, the key member 63 of the slider 6 is inserted into the key groove 59 of the lock bar 57 while the slider 6 advances toward the locking guide 53. Therefore, in the state illustrated in FIG. 6(c), the elastic force of the internal spring 56 that is more compressed than in FIG. 6(b) pushes the lock bar 57 in the direction of the lock ring 4. Further, the key member 63 of the slider 6 is inserted firmly into the key groove 59 of the lock bar 57, such that the lock bar 57 cannot retreat.

Therefore, in this state, it is possible to prevent the jumping phenomenon by which the lock bar 57 retreats.

Next, FIGS. 7(a)-7(c) illustrate a process of operating the electrical steering column lock from the locked state to the unlocked state. Referring to FIG. 7(a), the state corresponds to a state in which the locking guide 53 is positioned nearest the lock ring 4. In this state, the elastic force of the internal spring 56 that is more compressed pushes the lock bar 57 in the direction of the lock ring 4. Further, the key member 63 of the slider 6 is inserted into the key groove 59 of the lock bar 57, such that the lock bar 57 cannot retreat.

In this state, when the motor 51 rotates in a reverse direction, as illustrated in FIG. 7(b), the locking guide 53 retreats from the lock ring 4. In this case, the inclined surface of the grooved part 62 of the slider 6 faces the inclined surface of the protrusion 54 while the motor 51 rotates, such that the slider 6 starts to retreat from the locking guide 53. When the protrusion 54 is separated from the grooved part 62 of the slider 6 while the motor 51 rotates, the slider 6 is in the most retreating state, such that the key member 63 becomes separated from the key groove 59.

Next, as the motor 51 continuously rotates in the reverse direction, as illustrated in FIG. 7(c), the lock bar 57 retreats while the pin 55 of the locking guide 53 contacts the rear end of the elongated hole 58. As the lock bar continuously retreats, the chamfer of the leading end of the lock bar 57 completely retreats from the lock ring 4 to implement unlocking.

According to the exemplary embodiments of the present disclosure, the lock bar 57 can enter the lock ring 4 by the elastic force when the lock ring 4 is locked by the lock bar 57 and the key member of the slider 6 is inserted into the key groove of the lock bar 57 after the lock bar is once located at the locked position. This reliably prevents the jumping phenomenon of the lock bar. Further, the key member of the slider 6 can be separated from the key groove before the lock bar retreats by the locking guide 53 even when the lock bar 57 is unlocked from the lock ring 4, thereby properly implementing the unlocking operation like as in the prior art.

Therefore, according to the exemplary embodiments of the present disclosure, the lock bar 57 can reliably support the lock ring 4 regardless of manufacturing variations such as variations in machining and the surface treatment of the lock ring and the lock bar 57, while preventing the lock bar from jumping from the lock ring 4.

The present disclosure is described with reference to the embodiments illustrated in the drawings, which are only example and can be implemented by various embodiments. Therefore, the true scope of the present disclosure will be defined only by claims.

What is clamed is:

1. An electrical steering column lock, comprising:
   a locking guide that advances and retreats with respect to a lock ring, the locking guide driven by a driving part;
   a lock bar that advances toward and retreats from the locking guide within a predetetinined distance in the same direction as the advance and retreat direction of the locking guide, the lock bar having a leading end disposed toward the lock ring, and being elastically supported by the locking guide biased in a direction toward the lock ring,
   wherein one side of the locking guide is provided with a protrusion; and a slider that advances toward and retreats from the locking guide, the slider positioned facing the protrusion of the locking guide, wherein the slider is provided with a grooved part into which the protrusion is insertable, wherein the slider is elastically biased toward the locking guide, wherein at least one surface of the slider at which the protrusion of the locking guide contacts the grooved part is an inclined surface, the inclined surface guiding the protrusion of the locking guide, such that the slider advances toward the locking guide while the grooved part receives the protrusion of the locking guide along the inclined surface, and such that the slider retreats from the locking guide while the grooved part separates from the protrusion along the inclined surface, wherein the lock bar is provided with at least one key groove, and wherein the slider includes at least one key member that is inserted into the at least one key groove while the slider advances and is separated from the at least one key groove while the slider retreats.

2. The electrical steering column lock according to claim 1, wherein the at least one key groove is configured such that the at least one key member may be inserted into and separated from the at least one key groove in a state in which the lock bar advances so as to be locked into the lock ring.

3. The electrical steering column lock according to claim 1, wherein the locking guide is provided with a pin, and the lock bar is provided with an elongated hole that is longitudinally provided in the same direction as the advance and retreat direction thereof and is elastically supported to the locking guide biased in a lock ring direction in the state in which the elongated hole receives the pin.

4. The electrical steering column lock of claim 1, wherein the protrusion has at least one matingly inclined surface corresponding to the at least one inclined surface of the slider, the at least one matingly inclined surface configured to slidingly contact the at least one inclined surface of the slider.

5. The electrical steering column lock of claim 1, wherein the at least one key member is a plurality of key members, and wherein the inclined surface and the grooved part are formed in a body of the slider, the body extended in a direction substantially perpendicular to a plane containing the plurality of the key members.

* * * * *